(12) United States Patent
Scannell et al.

(10) Patent No.: US 10,766,628 B2
(45) Date of Patent: Sep. 8, 2020

(54) AIR INLET WITH INTEGRATED STRUCTURAL HAND HOLD

(71) Applicant: Bell Helicopter Textron Inc., Fort Worth, TX (US)

(72) Inventors: Brent Scannell, Roxboro (CA); Thomas Mast, Carrollton, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 552 days.

(21) Appl. No.: 15/706,394

(22) Filed: Sep. 15, 2017

(65) Prior Publication Data

US 2019/0084687 A1    Mar. 21, 2019

(51) Int. Cl.
| | |
|---|---|
| *B64D 33/02* | (2006.01) |
| *B64C 1/14* | (2006.01) |
| *B64D 29/08* | (2006.01) |
| *B64C 27/04* | (2006.01) |

(52) U.S. Cl.
CPC ............ *B64D 33/02* (2013.01); *B64C 1/1446* (2013.01); *B64D 29/08* (2013.01); *B64C 27/04* (2013.01); *B64D 2033/0253* (2013.01)

(58) Field of Classification Search
CPC .................... B64D 33/02; B64D 29/08; B64D 2033/0206; B64D 29/06; B64D 13/02; B64C 21/06; B64C 2001/0072; B64C 1/1446; B64C 1/24
See application file for complete search history.

(56) References Cited

U.S. PATENT DOCUMENTS

| | | | |
|---|---|---|---|
| 2,352,790 A | 7/1944 | Jordan | |
| 3,659,424 A * | 5/1972 | Polk, Jr. .................. | B64D 33/02 60/269 |
| 8,905,354 B2 | 12/2014 | Griffiths et al. | |
| 9,499,276 B2 | 11/2016 | Braeutigam | |
| 10,487,744 B2 * | 11/2019 | Post .......................... | F02C 3/04 |
| 2005/0045394 A1 | 3/2005 | Jones | |
| 2006/0048986 A1 * | 3/2006 | Bracciano ................ | B60H 1/28 180/69.2 |
| 2010/0012413 A1 * | 1/2010 | Chaney .................... | B60H 1/30 180/165 |

(Continued)

OTHER PUBLICATIONS

Bell 525 Relentless (Product Diagram), Bell Helicopter, A Textron Company; Flight International from Flightglobal, Tim Hall (FRAeS, Fort Worth, Texas), Reed Business Information, Published Nov. 12, 2014. (1 page).

(Continued)

*Primary Examiner* — Assres H Woldemaryam
(74) *Attorney, Agent, or Firm* — Patent Capital Group

(57) ABSTRACT

This disclosure relates to an air inlet for an aircraft with an integrated hand hold. One innovative aspect of the subject matter described herein can be implemented as an air inlet on the exterior surface of a cowling for a rotorcraft, wherein the air inlet having a scoop that includes a bottom surface having a wide, flat, front edge that angles downward towards the back, an opening in the back for air to enter, and two lateral sides coupled to the bottom surface, where the two sides are planar on a top surface and become longer in height towards the opening in the back, and hand hold, where the hand hold is a trough or an indentation in the bottom surface of the scoop that extends along a side.

14 Claims, 4 Drawing Sheets

(56) References Cited

U.S. PATENT DOCUMENTS

| | | | | |
|---|---|---|---|---|
| 2010/0126182 | A1* | 5/2010 | Hoover | F01D 17/105 60/785 |
| 2017/0145919 | A1* | 5/2017 | Aubert | F02C 7/055 |

OTHER PUBLICATIONS

Perry, Dominic, "Analysis: Bell 525 Relentless Cutaway and Technical Description", Flight Global, Flight International, Bell Helicopter, Published Nov. 12, 2014. (8 pages).

* cited by examiner

AIR INLET WITH INTEGRATED STRUCTURAL HAND HOLD

TECHNICAL FIELD

This disclosure relates to a structural hand hold for an aircraft. More specifically, this disclosure relates to an air inlet on a cowling of a rotorcraft having an integrated structural hand hold.

BACKGROUND

It is beneficial to provide structures for maintenance personnel to efficiently and safely access the upper portions of an aircraft. Some rotorcrafts include cowlings configured to act as a protective fairing around equipment, such as propulsion related components, auxiliary power units (APU) and environmental control units (ECU). A cowling may include an air intake or air inlet structure to provide an aerodynamic flow path from the exterior of the cowling to the engine inlet.

SUMMARY

This disclosure relates to an air inlet structure on a cowling of a rotorcraft having an integrated hand hold.

One innovative aspect of the subject matter described herein can be implemented as an air inlet on the exterior surface of a cowling for a rotorcraft, wherein the air inlet includes a scoop or tray and an indentation or trough along one side of the scoop that functions as a hand hold. In another innovative aspect, an air inlet includes a bottom side having a wide, flat, front edge that angles or slopes downward towards the back, an opening in the back side of the air inlet for air to enter, two sides that are planar along the top sides and higher towards the back opening, and an indentation or trough in the bottom surface that extends along a side edge creating a hand hold.

This, and other aspects, may include one or more of the following features. The hand hold may be an elongated, substantially straight indentation that extends along a side of an air inlet from front to back. The air inlet may be aligned to face forward during flight to enable air flow into the air inlet. The opening in the back of the air inlet may be aligned with a component of the rotorcraft, such as an engine, that requires an inflow of air.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1A:
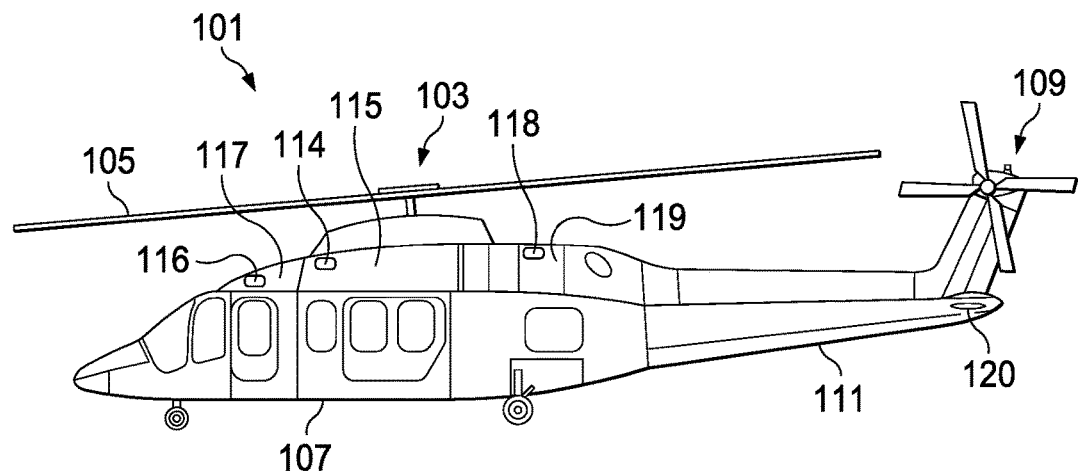
FIGS. 1A and 1B illustrate an example rotorcraft including an air let having a hand hold, in accordance with various embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Like reference numbers and designations in the various drawings indicate like elements. Moreover, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

Figure 1B:
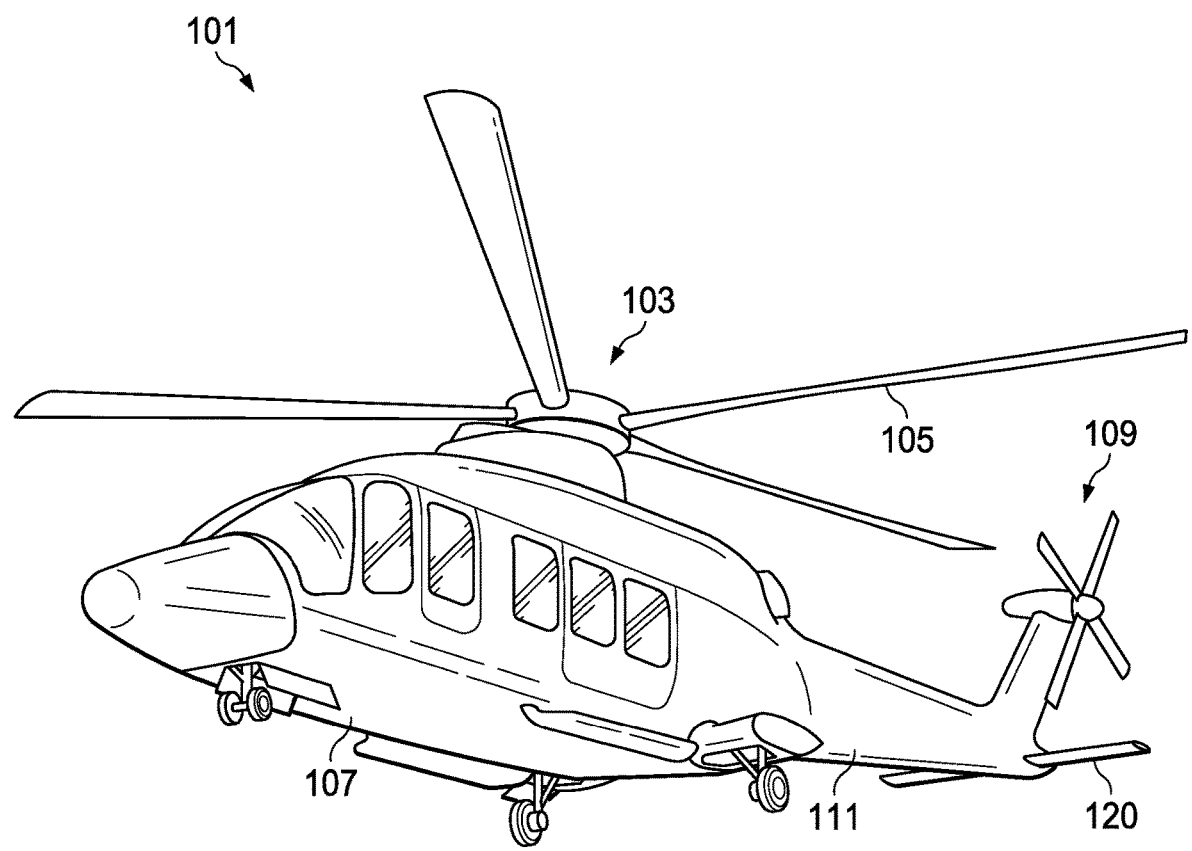

FIGS. 1A and 1B illustrate an example embodiment of a rotorcraft 101. FIG. 1A illustrates a side view of rotorcraft 101, while FIG. 1B illustrates a perspective view of rotorcraft 101. Rotorcraft 101 has a rotor system 103 with a plurality of rotor blades 105. The pitch of each rotor blade 105 may be managed or adjusted in order to selectively control direction, thrust, and lift of rotorcraft 101. Rotorcraft 101 further includes a fuselage 107, anti-torque system 109, an empennage 111, and a tail structure 120. In this example, tail structure 120 can represent a horizontal stabilizer. Torque is supplied to rotor system 103 and anti-torque system 109 using at least one engine. Rotorcraft may also include a variety of cowling assemblies (or cowlings) configured to cover components of the rotorcraft and reduce aerodynamic drag. Rotorcraft 101 may include one or more air intakes having integrated hand holds 114, 116, 118 located on the cowlings 115, 117, 119 to enable increased safety for an operator when accessing the upper deck of the rotorcraft, in accordance with various embodiments. For example, FIG. 1A illustrates an engine cowling 119 for covering a rotorcraft engine having air intake 118, and a transmission cowling 115 for covering a rotorcraft transmission having air intake 114. As most rotorcrafts include two engines and two transmissions, another engine cowling having an air intake and transmission cowling having an air intake would be located on the opposite side of rotorcraft 101 (not shown). FIG. 1A further illustrates an environmental control unit (ECU) fairing 117 that covers an ECU having an air intake 116. The ECU fairing may be a hinged fairing that folds forward when opened. In various embodiments disclosed herein, air intakes 114, 116, and 118 may include an integrated hand hold along the bottom side of the air intake to enable personnel to access the upper portions of the aircraft. It should be appreciated that although each fairing is depicted with an air inlet, the placement and number of air inlets is exemplary as well as the equipment associated with the air inlets. It may be understood that an air inlet may be placed in a different location on the fairing, may be placed on a different fairing, and, in some circumstances, may not be used. The terms cowl, cowling, and fairing may be used interchangeably in the context of this disclosure. Likewise, as used herein, air inlet, air duct, and air intake may be used interchangeably.

It should be appreciated that rotorcraft 101 of FIGS. 1A and 1B is merely illustrative of a variety of aircraft that can be used to implement embodiments of the present disclosure. Other aircraft implementations can include, for example, fixed wing airplanes, hybrid aircraft, unmanned aircraft, gyrocopters, and a variety of helicopter configurations, among other examples. Moreover, it should be appreciated that even though aircraft are particularly well suited to implement embodiments of the present disclosure, the described embodiments can also be implemented using non-aircraft vehicles and devices.

INTRODUCTION TO THE INVENTION

The embodiments described throughout this disclosure provide numerous technical advantages, including an air inlet having a hand hold, where the air inlet is disposed on a cowling, and the hand hold enables an operator to access the maintenance platform on the upper deck during service.

Example embodiments that may be used to implement the air inlet with an integrated hand hold are described below with more particular reference to the remaining FIGURES.

Figure 2:
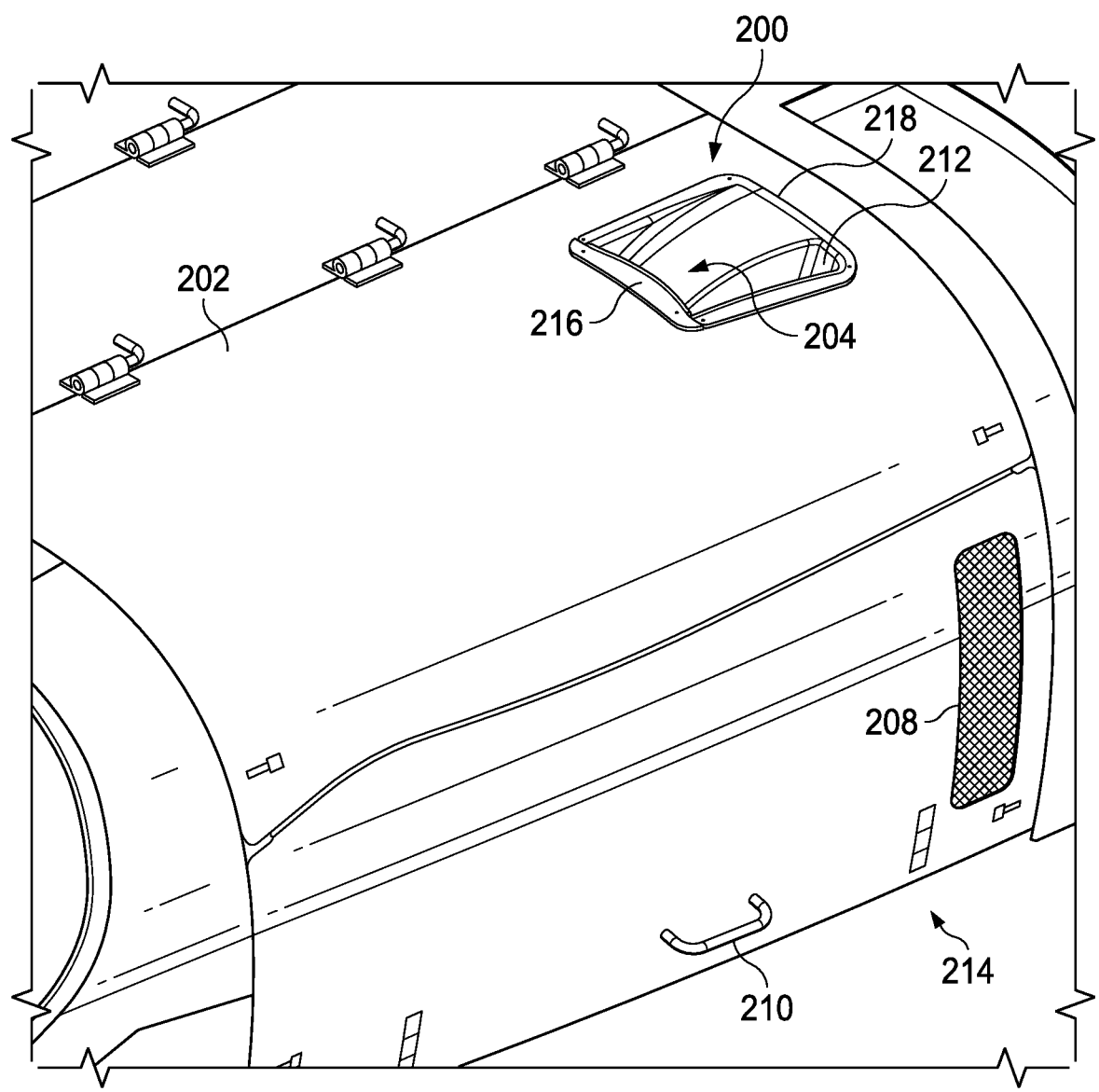
FIG. 2 illustrates an example air intake with a hand hold on a cowling of a rotorcraft, in accordance with various embodiments.

FIG. 2 shows an example air intake 200 with a hand hold 212 that may be attached to a cowling on the fuselage of an aircraft from a top, right-hand side view, forward looking perspective, in accordance with various embodiments. For clarity and a point of reference, a right-hand side perspective is the right side of the aircraft when seated in the aircraft and facing forward. As shown in FIG. 2, cowling 202 may be an engine cowling having an air inlet 200 on the surface, a screened vent 208, and a handle 210 for opening the cowling, among other features. Air inlet 200 may include hand hold 212, which may be along the side of the air inlet closest to a bottom side of the aircraft 214 (i.e., closest to the ground). During flight, air moves from the front side 218 of the inlet to the opening in the back side 216, enters the opening 204 in the back side, and feeds the air to the associated equipment.

Figure 3A:
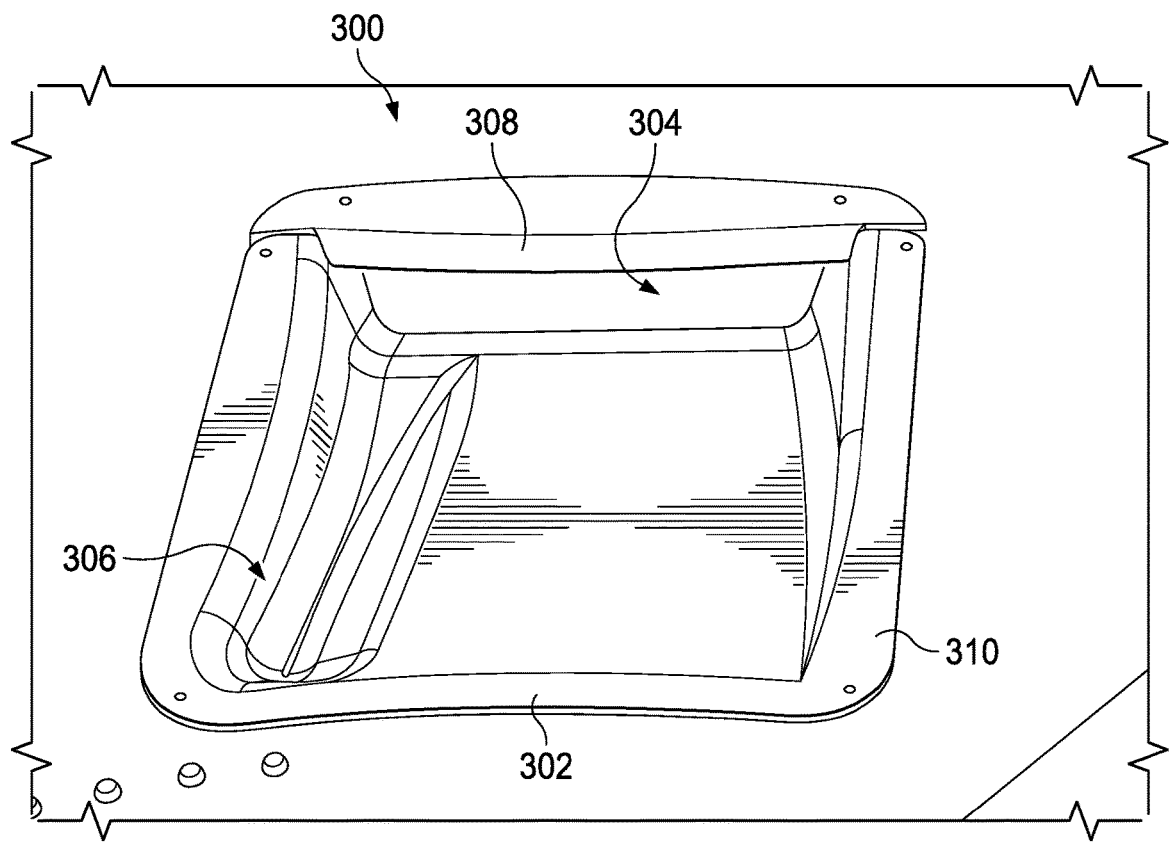
FIGS. 3A and 3B are illustrations of an example air inlet having a hand hold, in accordance with various embodiments.
Figure 3B:
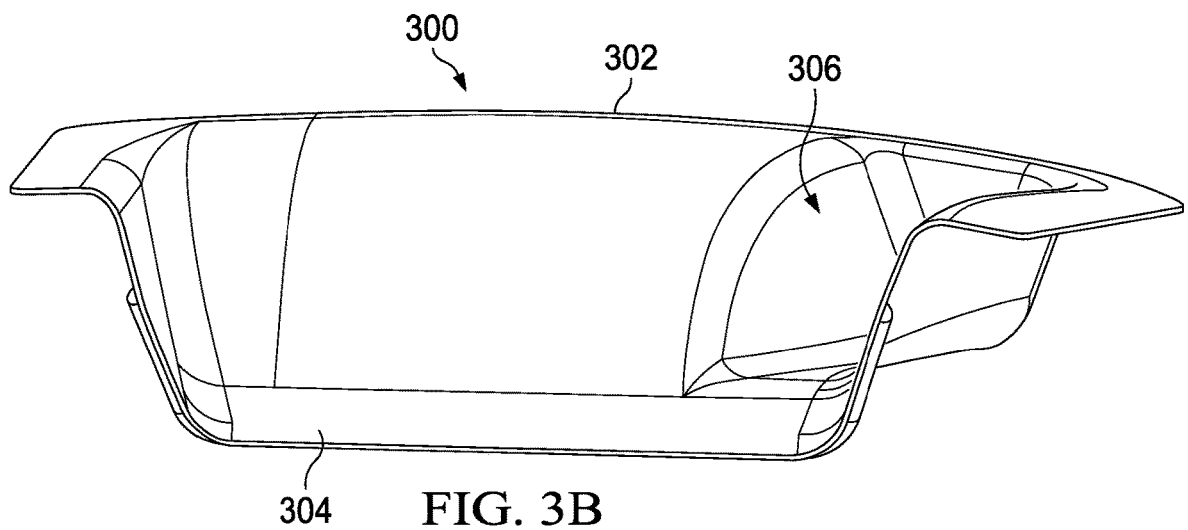

FIGS. 3A and 3B are more detailed illustrations of an example air inlet having a hand hold 300. FIG. 3A is a top view, front-to-back perspective of air inlet 300. Air inlet 300 may be made from any suitable material or materials, such as, plastic, metal, rubber, synthetics, and composite materials, among others. Air inlet 300 may be formed using any suitable process, for example, compression molding, and may be any suitable size and shape for providing air to the engine, including an opening or cut out in base panel, such as a circular or rectangular hole with or without a screen, a submerged duct, such as a National Advisory Committee for Aeronautics (NACA) duct, or a protruding scoop, such as a ram air scoop. In some embodiments, the air inlet may be formed from the same materials as the cowling, for example, aluminum, aluminum alloy, steel, reinforced plastics, and advanced composites, including carbon fiber reinforced polymer (CFRP). In some embodiments, as shown in FIG. 3A, air inlet 300 may be shaped like a tray or scoop having a flat leading edge 302 facing towards the front of the rotorcraft, a bottom that slopes downwards towards an opening 304 in the back of the scoop, and two lateral sides (for example, the sides are positioned along a lateral axis as compared to the front and back which are positioned along a longitudinal axis) that are attached to the bottom surface. In some embodiment, the two lateral sides may be coupled to the bottom surface. In some embodiments, the two sides are connected to the bottom surface and form a single continuous structure. In some embodiments, the sides are the same height along their entire length. In some embodiments, the sides are longer in height towards the back edge. In some embodiments, the two lateral sides are equidistant along their entire length. In some embodiments, the two lateral sides may angle inwards towards the front and/or the back of the air inlet. Air flows from the front edge into the opening at the back and is fed to the associated equipment. In some embodiments, air inlet 300 may be inset on the cowling such that the top surface of the air inlet (as well as the top surfaces of the two sides) is substantially planar or flush with the surface of the cowling to help minimize the effect on aerodynamics. In some embodiments, a top surface of the air inlet 300 may extend above the surface of the cowling. Air inlet 300 may have a flange 310 along its edges to attach to the surface of the cowling. Air inlet 300 may be attached to the cowling using any suitable means, including, for example, a screw, a rivet, a fastener, an adhesive, or a co-cured composite, among others. Hand hold 306 may be positioned on the air inlet 300, for example, along one side, typically, along the side closest to the ground, for easier access. Hand hold 306 may be any suitable size and shape for enabling gripping, including an indentation or cutout in the bottom side of the air inlet that creates a channel or finger pocket as a hand hold along a side. The opening on the back side 304 of air inlet 300 may include a soft edge 308 on the cowling to provide laminar air flow into the intake. The soft edge 308 may be formed from any suitable material, including a carbon composite material, fiberglass, aluminum, titanium, and corrosion resistant steel (CRES), among others. Air inlet 300 may have an integral draining mechanism (not shown) to allow rain water or other accumulated fluids to be evacuated; for example, air inlet 300 may include a small ¼" hole positioned at the lowest point when the aircraft is at normal cruising attitude to drain any collected fluid.

FIG. 3B is a side view, from a back-to-front perspective of air inlet 300. As shown, air inlet 300 is scoop-shaped with a low edge along the back side 304 that slopes upwards towards the front edge 302, which is also towards the front of the rotorcraft. Hand hold 306 is an indented feature or trough along one side of air inlet 300. Hand hold may be formed as an indentation in the bottom of the air inlet. In some embodiments, hand hold may be formed to include an indentation on a side of the air inlet. Hand hold 306 may operate as structural reinforcement allowing maintenance personnel to use for climbing up to a walk platform, for example to perform maintenance on the aft of the rotorcraft. The indentation or trough of hand hold 306 may be designed to maintain the inlet air path, or minimally disrupt the inlet air path, and not obstruct the inlet of air to the associated equipment, for example, the engine or the transmission. In some embodiments, the hand hold may be designed to be deep and narrow. In some embodiments, the hand hold may be designed to be shallow and wider.

Figure 4A:
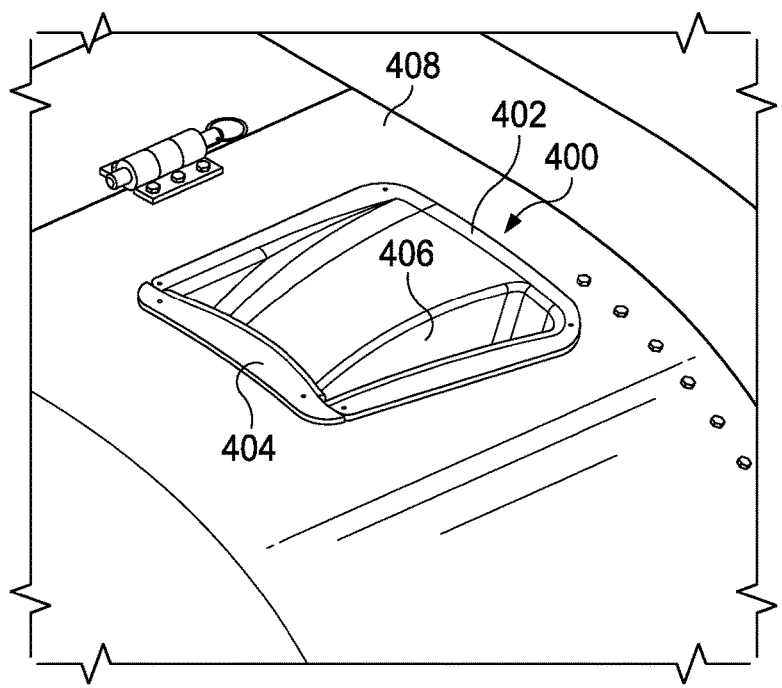
FIGS. 4A and 4B are illustrations of example air inlets having right-sided and left-sided hand holds, respectively, in accordance with various embodiments.
Figure 4B:
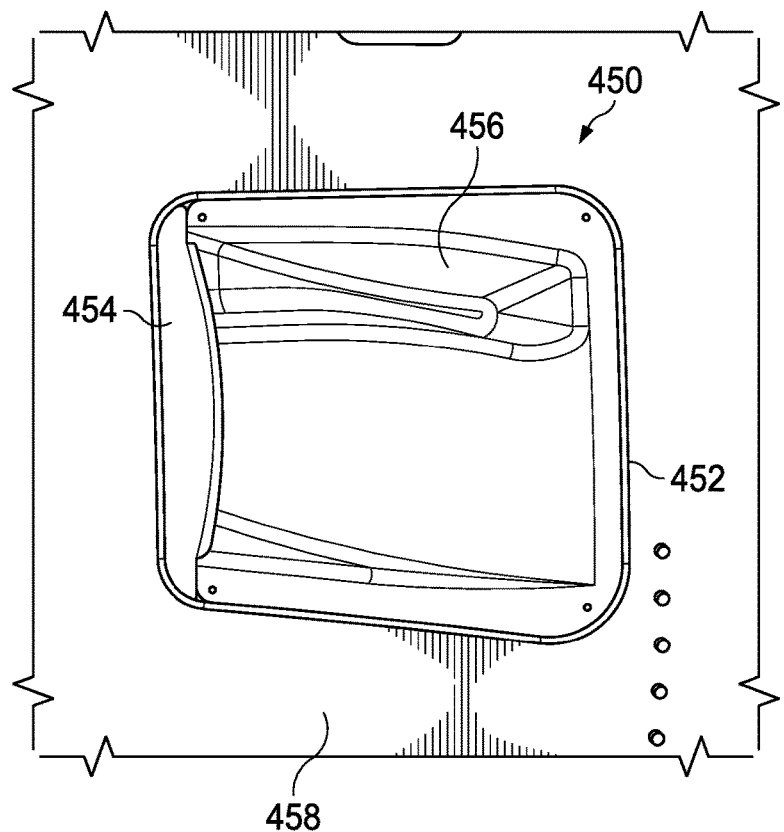

FIGS. 4A and 4B are more detailed illustrations of example air inlets having right-sided and left-sided hand holds, respectively, in accordance with various embodiments. FIG. 4A illustrates an exemplary air inlet 400 having a right-sided hand hold 406. Air inlet 400 has a front edge 402 and back edge with an opening 404 for air to enter. Air inlet 400 may be placed on a cowling 408 on the right-side of the rotorcraft such that hand hold 406 is located closer to the ground. FIG. 4B illustrates an exemplary air inlet 450 having a left-sided hand hold 456. Air inlet 450 has a front edge 452 and back edge with an opening 454 for air to enter. Air inlet 450 may be placed on a cowling 458 positioned on the left-side of the rotorcraft such that hand hold 456 is located closer to the ground. In some embodiments, air inlet 400 may have two hand holds, a right-sided trough and a left-sided trough, such that the air inlet is not sided and may provide a hand hold when placed on either side of the aircraft.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

What is claimed is:

1. An air inlet on a cowling of an aircraft, the air inlet comprising:
   a scoop, wherein the scoop comprises:
      a bottom surface, wherein the bottom surface has a flat front leading edge and slopes downwards towards a back edge of the scoop;
      at least two sides, wherein the two sides are substantially planar along a top edge and are shorter towards the flat front leading edge of the scoop; and
      an opening at the back edge of the scoop; and
   a hand hold on the scoop, wherein the hand hold is an indentation in the bottom surface of the scoop along a first side.

2. The air inlet of claim 1, further comprising a top surface of the air inlet, wherein the top surface of the air inlet is planar with the surface of the cowling.

3. The air inlet of claim 1, further comprising a top surface of the air inlet, wherein the top surface of the air inlet is above the surface of the cowling.

4. The air inlet of claim 1, wherein the scoop further comprises:
   a soft edge on the cowling at the back edge of the scoop.

5. The air inlet of claim 1, wherein the scoop comprises one or more of aluminum, aluminum alloy, steel, reinforced plastic, and a carbon composite.

6. The air inlet of claim 4, wherein the soft edge comprises one or more of a carbon composite material, fiberglass, aluminum, titanium, and corrosion resistant steel (CRES).

7. The air inlet of claim 1, further comprising a second hand hold on the scoop, wherein the second hand hold is an indentation in the bottom surface of the scoop along a second side.

8. A rotorcraft, comprising:
   a cowling,
   an engine;
   an air inlet for the engine on the cowling, the air inlet comprising:
      a scoop, wherein the scoop comprises:
         a bottom surface, wherein the bottom surface has a flat front leading edge and slopes downwards towards a back edge of the scoop;
         at least two sides, wherein the two sides are substantially planar along a top edge and are shorter towards the flat front leading edge of the scoop; and
         an opening at the back edge of the scoop; and
      a hand hold on the scoop, wherein the hand hold is an indentation in the bottom surface of the scoop along a first side.

9. The rotorcraft of claim 8, further comprising a top surface of the air inlet, wherein the top surface of the air inlet is planar with the surface of the cowling.

10. The rotorcraft of claim 8, further comprising a top surface of the air inlet, wherein the top surface of the air inlet is above the surface of the cowling.

11. The rotorcraft of claim 8, wherein the scoop further comprises:
    a soft edge on the cowling at the back edge of the scoop.

12. The rotorcraft of claim 8, wherein the scoop comprises one or more of aluminum, aluminum alloy, steel, reinforced plastic, and a carbon composite.

13. The rotorcraft of claim 11, wherein the soft edge comprises one or more of a carbon composite material, fiberglass, aluminum, titanium, and corrosion resistant steel (CRES).

14. The rotorcraft of claim 8, further comprising a second hand hold on the scoop, wherein the second hand hold is an indentation in the bottom surface of the scoop along a second side.

* * * * *